United States Patent [19]

Schober et al.

[11] Patent Number: 5,280,963
[45] Date of Patent: Jan. 25, 1994

[54] COUPLER FOR APPLIANCE HOSE

[75] Inventors: Stephen D. Schober; Jay P. Schubick, both of Newton, Iowa

[73] Assignee: Maytag Corporation, Newton, Iowa

[21] Appl. No.: 844,721

[22] Filed: Mar. 2, 1992

[51] Int. Cl.⁵ ................................. F16L 55/07
[52] U.S. Cl. ............................. 285/8; 285/38; 285/27; 285/316
[58] Field of Search ............ 285/8, 38, 315, 316, 285/27

[56] References Cited

U.S. PATENT DOCUMENTS

| D. 314,234 | 1/1991 | Beaston | D23/262 |
|---|---|---|---|
| 327,737 | 10/1885 | Strong | 285/38 |
| 1,134,179 | 4/1915 | Boyd | 285/38 X |
| 3,227,380 | 1/1966 | Pinkston | 285/8 X |
| 3,559,681 | 2/1971 | Jarvis et al. | 137/594 |
| 3,593,743 | 7/1971 | Guth | 137/562 |
| 3,594,694 | 7/1971 | Clark | 285/316 X |
| 3,788,347 | 1/1974 | Guth | 137/355.17 |
| 3,836,114 | 9/1974 | Norton et al. | 285/316 X |
| 3,941,153 | 2/1976 | Traube et al. | 137/562 |
| 4,026,323 | 5/1977 | Goodlaxson | 137/562 |
| 4,039,209 | 8/1977 | Goodlaxson et al. | 285/8 |
| 4,070,003 | 1/1978 | Shames et al. | 285/316 X |
| 4,078,575 | 3/1978 | Shames et al. | 137/562 |
| 4,102,544 | 7/1978 | Goodlaxson | 285/8 |
| 4,213,482 | 7/1980 | Gondek | 285/316 X |
| 4,543,993 | 10/1985 | Calvin et al. | 285/316 X |
| 4,582,347 | 4/1986 | Wilcox et al. | 285/316 X |
| 4,781,399 | 11/1988 | Collon | 285/8 |
| 4,964,657 | 10/1990 | Gonzales | 285/8 |
| 5,066,049 | 11/1991 | Staples | 285/315 X |
| 5,087,081 | 2/1992 | Yoon | 285/8 |
| 5,110,157 | 5/1992 | Chen | 285/8 |
| 5,116,086 | 5/1992 | Psad | 285/315 X |
| 5,179,976 | 1/1993 | Boland et al. | 285/27 X |

FOREIGN PATENT DOCUMENTS

| 0583398 | 11/1976 | Switzerland | 285/315 |
|---|---|---|---|
| 0028467 | of 1906 | United Kingdom | 285/8 |
| 0413533 | 7/1934 | United Kingdom | 285/8 |

Primary Examiner—Randolph A. Reese
Assistant Examiner—Heather Chun
Attorney, Agent, or Firm—Zarley, McKee, Thomte, Voorhees & Sease

[57] ABSTRACT

A coupler assembly for connecting an appliance hose to a faucet spout includes a coupler body connected to the hose and having an inlet opening sized to telescopically fit over the faucet spout. A retaining collar slides over the coupler body from a hold position in retentive engagement with the faucet spout to a release position out of retentive engagement with the faucet spout. The retaining collar includes a thumb tab extending radially outwardly therefrom.

10 Claims, 4 Drawing Sheets

COUPLER FOR APPLIANCE HOSE

BACKGROUND OF THE INVENTION

This invention relates to a coupler for an appliance hose, and particularly to a coupler which is used to connect an appliance hose to the spout of a sink faucet. Such a coupler is sometimes used to connect the water hose inlet of a dishwasher to the spout of a faucet in a kitchen sink.

An example of a typical prior art coupler is shown in U.S. Pat. No. 4,078,575. This patent discloses a coupler body having an inlet opening adapted to telescopically fit over the spout of a kitchen sink faucet. A locking sleeve or retaining collar is vertically slidable on the outside of the body to a hold position wherein the locking sleeve engages and moves locking studs into retentive engagement with the spout of the faucet. The sleeve or collar is movable away from the hold position to a release position to permit the studs to move out of retentive engagement with the faucet and thereby permit the removal of the coupler from the faucet.

Considerable difficulty is encountered in trying to mount these prior coupling devices to the faucet spout, particularly if the operator has only one hand free to accomplish the coupling process. Most prior art devices require both hands to accomplish the locking process, with one hand being used to hold the coupler body and with the other hand being used to slide the locking sleeve between its hold and release positions.

An example of a prior art hose coupler for a dishwasher is shown in U.S. Pat. No. 4,026,323. This patent shows a pivoted operating lever which is not integral with the coupling sleeve. It pivots to cause movement of a pressure relief mechanism before axial movement of the coupling sleeve to its release position. Other examples of separate pivoting levers are shown in U.S. Pat. Nos. 3,788,347 and 3,593,743.

Another disadvantage of prior devices is the difficulty with which the sleeve sometimes moves between its hold and release positions. Normally the sleeve is urged toward its hold position by a spring. When pressure is applied downwardly on the sleeve to move it away from its hold position, the sleeve sometimes becomes misaligned on the coupler body and binds, thereby making the sliding movement difficult. Such binding also sometimes occurs when the sleeve is urged from its released position back to its hold position by the spring, and the binding can sometimes result in unsatisfactory coupling of the coupler to the faucet spout.

SUMMARY OF THE INVENTION

Therefore a primary object of the present invention is the provision of an improved coupler for an appliance hose.

A further object of the present invention is the provision of an improved coupler having a thumb operated tab incorporated into the retaining collar which permits the retaining collar to be moved between its release and hold positions with one hand.

A further object of the present invention is the provision of an improved coupler which utilizes bearing surfaces to prevent the binding of the retaining collar as it moves between its hold and release positions.

A further object of the present invention is the provision of an improved coupler for an appliance hose which will not become misaligned or bind when moving between its release and hold positions, even when the downward pressure on the retaining collar is unevenly applied to one side thereof.

A further object of the present invention is the provision of an improved coupler which is economical to manufacture, durable in use, and efficient in operation.

The present invention provides a coupler assembly for connecting an appliance to a faucet including a coupler body having an inlet end connectable to the faucet. A sliding retaining collar surrounds the inlet end of the coupler body and is adapted to move from a hold position in retentive engagement with the faucet spout to a release position out of retentive engagement with the faucet spout. A thumb tab extends outwardly from one side of the retaining collar and can be depressed by the operator's thumb to move the retaining collar from its hold position to its release position. The use of the thumb tab with the sliding retaining collar permits the coupler to be coupled and uncoupled from the faucet spout while using only one hand.

DETAILED DESCRIPTION OF THE PREFERRED EMBODIMENT

Figure 1:
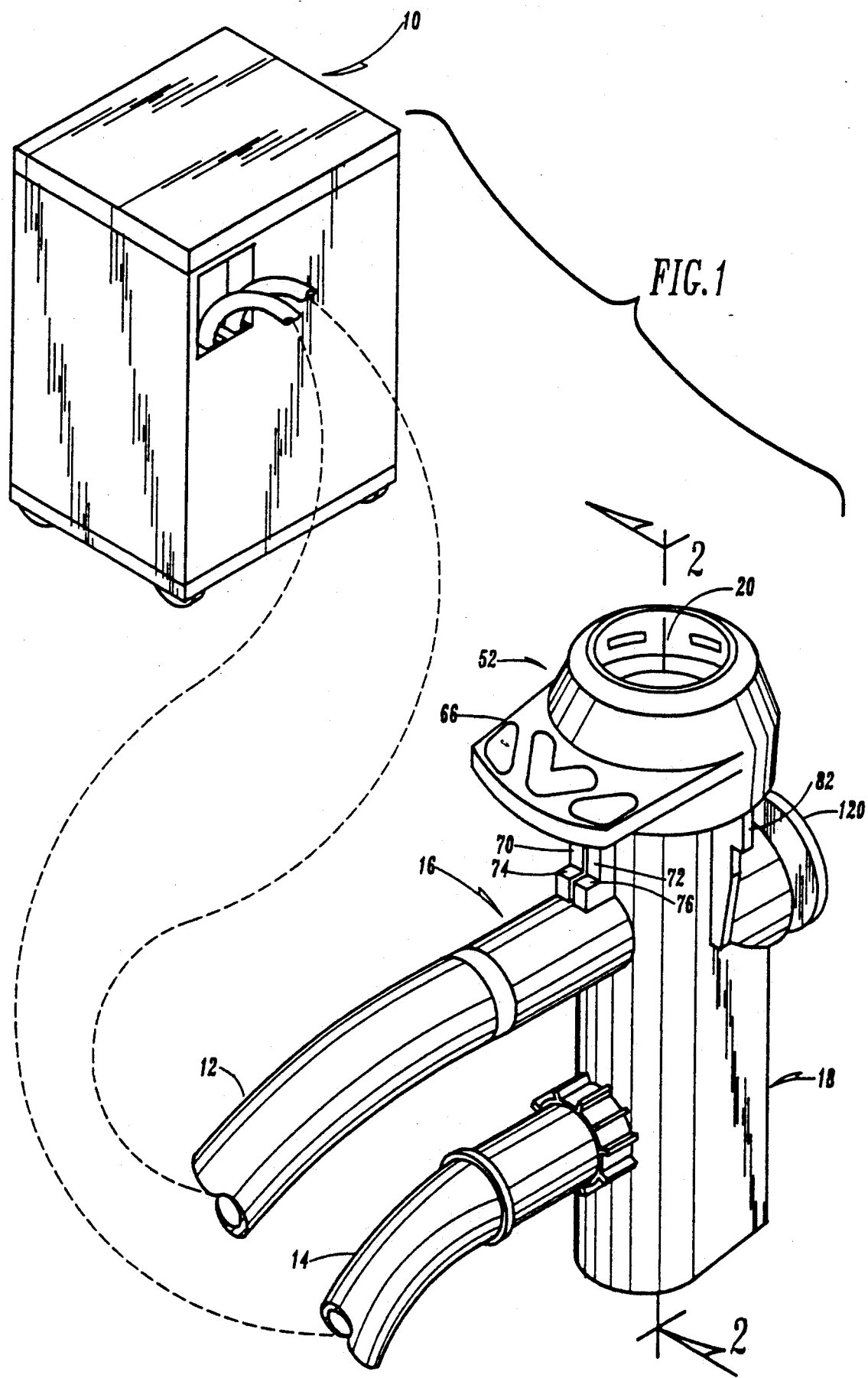
FIG. 1 is a perspective view of a portable dishwasher showing the coupler of the present invention in an enlarged perspective view.

Referring to FIG. 1 a dishwasher 10 includes a supply hose 12 and a drain hose 14 extending outwardly from the rear thereof. Hoses 12, 14 are connected to a coupler 16 which is adapted to be connected to a faucet spout 118 (FIGS. 4 and 5) of a conventional kitchen faucet.

Coupler 16 comprises a coupler body 18 having a female inlet end opening 20 adapted to telescopically fit over the faucet spout 118. Coupler body 18 includes a lower end 22 having a first discharge opening 24 and a second discharge opening 26. Coupler body 18 is also provided with a supply nipple 28 having a supply hose receiving end 30 and a drain nipple 32 having a drain hose receiving end 34.

The inlet end opening 20 of the coupler body 18 is in communication with a supply flow passage 36 which provides further communication to a supply bore 38 within supply nipple 28. Thus, when the inlet end opening 20 is fitted over the faucet spout 118, water can flow through opening 20, passage 36, bore 38 into supply hose 12. The drainage water from the dishwasher 10 is pumped outwardly through drain hose 14 into the drain nipple 32 where it is expelled outwardly and downwardly through discharge opening 26 into the sink below the faucet spout 118.

The upper end of coupler body 18 includes a cylindrical wall 40 having four radial slots 42 (FIGS. 2-4) which house four locking lugs 44. Each locking lug 44 includes an outer cam shoulder 46 and an inner protruding locking nose 48 which is adapted to retentively engage the outer circumference of the faucet spout 118.

Figure 4:
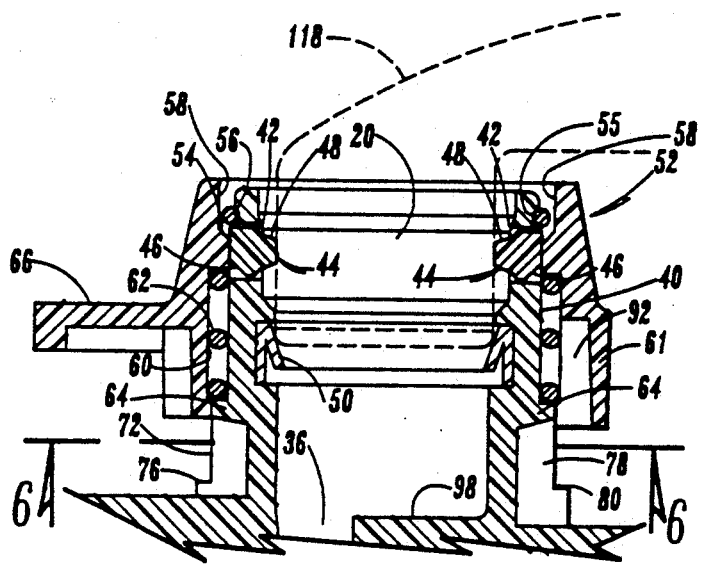
FIG. 4 is a sectional view taken along line 4—4 of FIG. 3.
Figure 5:
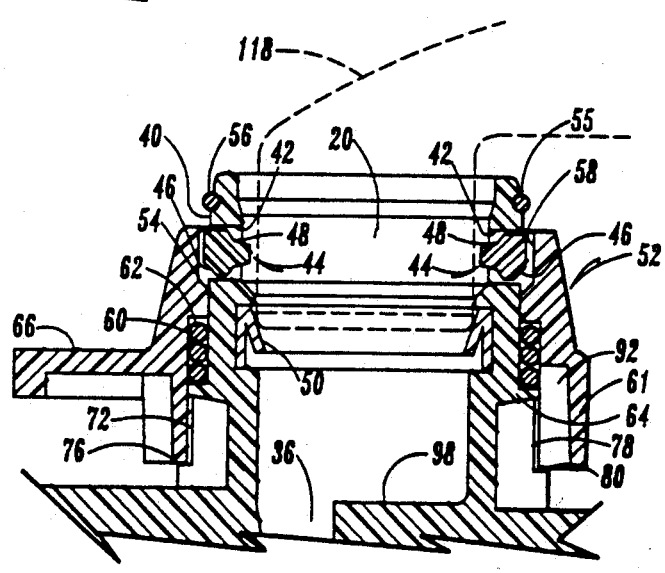
FIG. 5 is a view similar to FIG. 4, but showing the retaining collar in its lower most release position.

Mounted within the inlet opening 20 is an annular U-packing 50 which is made of rubber or other elastomeric material and which is adapted to engage the tip of the faucet spout 118 as shown in FIGS. 4 and 5 to provide a seal therewith.

Figure 6:
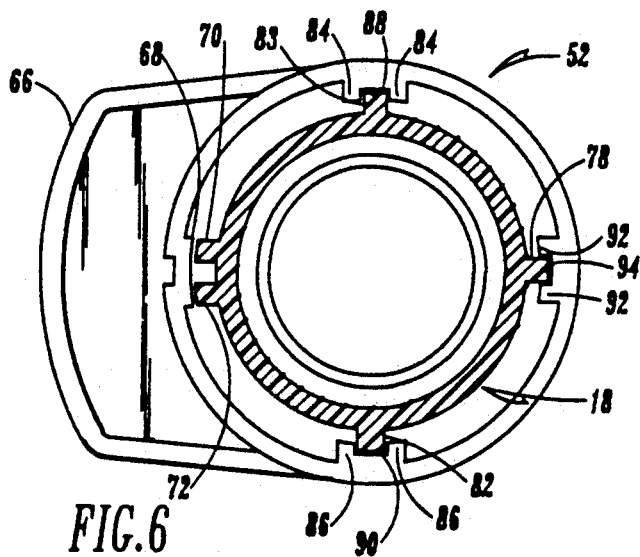
FIG. 6 is a sectional view taken along line 6—6 of FIG. 4.
Figure 7:
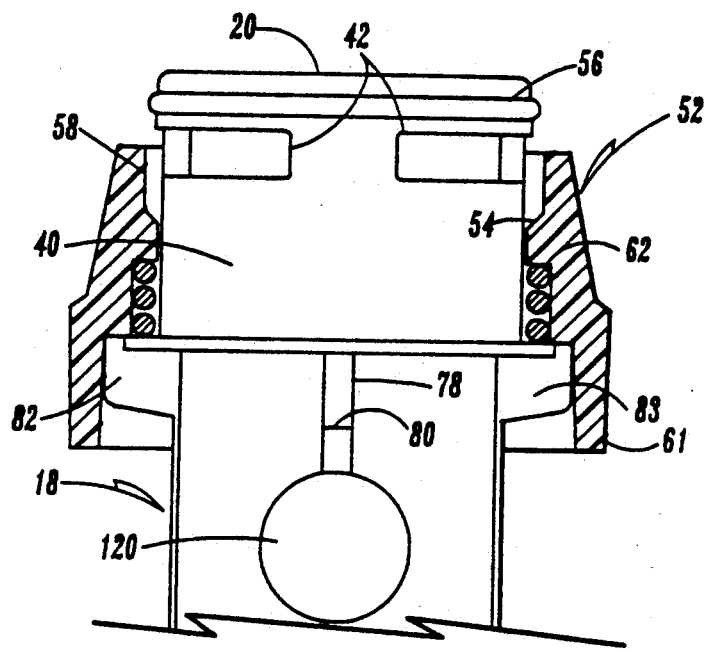
FIG. 7 is an elevational view taken from the right of FIG. 2 showing the retaining collar in section and a its release position.
Figure 8:
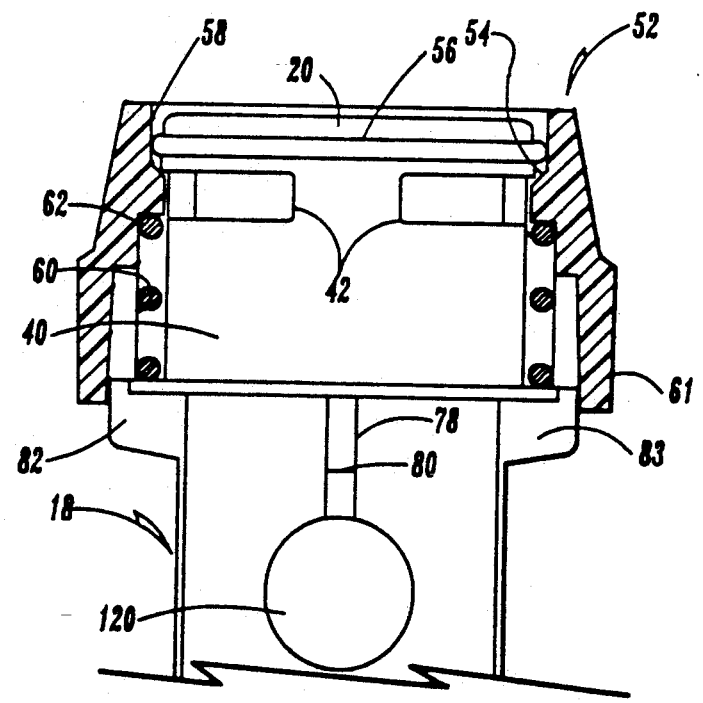
FIG. 8 is a view similar to FIG. 7, but showing the retaining collar in its hold position.

Slidably fitted over the outside of the upper end of coupler body 18 is a retaining sleeve or collar 52. Collar 52 includes an annular cam shoulder 54 which is adapted to engage a locking ring 56 fitted within a locking ring groove 55 on the outer circumference of the upper end of coupler body 20. Locking ring 56 prevents the retaining sleeve or collar 52 from sliding upwardly off of the upper end of coupler body 18. Above annular cam shoulder 54 is an upper counter bore 58, and below shoulder 54 is a lower counter bore 60 which forms a skirt 61 for sleeve or collar 52. A spring 62 is fitted within lower counter bore 60 and is compressed between a spring stop flange 64 on the outer surface of coupler body 18 and the lower surface of annular cam shoulder 54. Spring 62 yieldably urges the sleeve or collar 52 upwardly to the positions shown in FIGS. 1 and 4. Sleeve or collar 52 includes a radially outwardly extending thumb tab 66 which can be engaged by the operator's thumb to depress the collar 52 from the retaining or hold position shown in FIGS. 1 and 2 to the release position shown in FIGS. 5 and 7. This sliding movement of collar 52 is facilitated by a bearing rib 68 which is on the interior surface of collar 52 (FIG. 6) and by a pair bearing ribs 70, 72 which protrude radially outwardly from the coupler body 16. Ribs 68, 70, 72 are vertical, and the ribs 70, 72 slidably engage the interior surface of rib 68 so as to maintain the collar 52 in outward radial spaced relation from the coupler body 18 as readily shown in FIG. 6. As best shown in FIG. 1, ribs 70, 72 are each provided with upwardly facing stop shoulders 74, 76 respectively for limiting the downward movement of the collar 52 to the position shown in FIGS. 5 and 7.

The rear side of the coupler body 18 is provided with a rear guide rib 78 which is diametrically opposed to the pair of bearing ribs 70, 72. Guide rib 78 is provided with an upwardly presented stop shoulder 80. Two additional guide ribs 82, 83 are provided approximately 90 degrees away from ribs 70, 72 and rib 78. The interior of the collar 52 includes a pair of side collar ribs 84 and another pair of side collar ribs 86 each of which have grooves 88, 90 therebetween. Grooves 88, 90 accommodate the side ribs 82, 83 of the coupler body 18 so as to prevent rotational movement of the collar 52 with respect to the coupler body 18.

A pair of rear collar ribs 92 are provided adjacent the rear guide rib 78, and provide a rear groove 94 for slidably accommodating the rear guide rib 78.

The ribs described above cause the skirt 61 of the collar 52 to be spaced radially outwardly from the coupler body 18 so that when the tab 66 is depressed, slight tilting of the collar 52 will not result in binding as the collar 52 slides downwardly. Ribs 70 and 72 provide a bearing surface for the collar 52 and facilitate smooth sliding movement of the collar 52 from its retaining or hold position shown in FIG. 4 to its release position shown in FIG. 5. In its hold position, the cam shoulder 54 of collar 52 engages the locking lugs 44 and urges them radially inwardly into retentive engagement with the outer circumference of the faucet spout 118. However, when the collar 52 is moved downwardly to its release position, the locking lugs 44 are free to move radially outwardly into engagement with the counter bore 58 of collar 52 thereby releasing their retentive engagement with the faucet spout 118 and permitting removal of the coupler 16 from the faucet spout 118.

Figure 2:
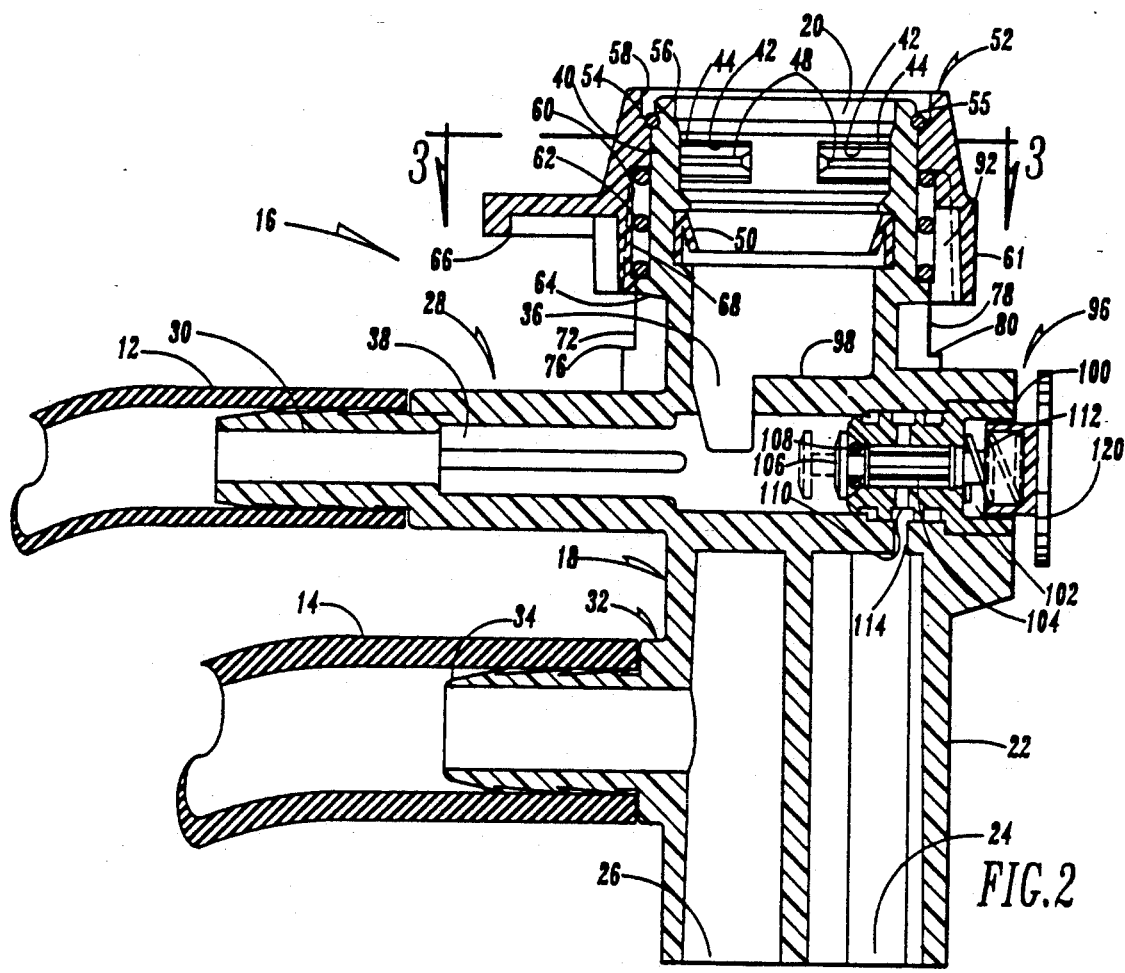
FIG. 2 is a sectional view taken along line 2—2 of FIG. 1.
Figure 3:
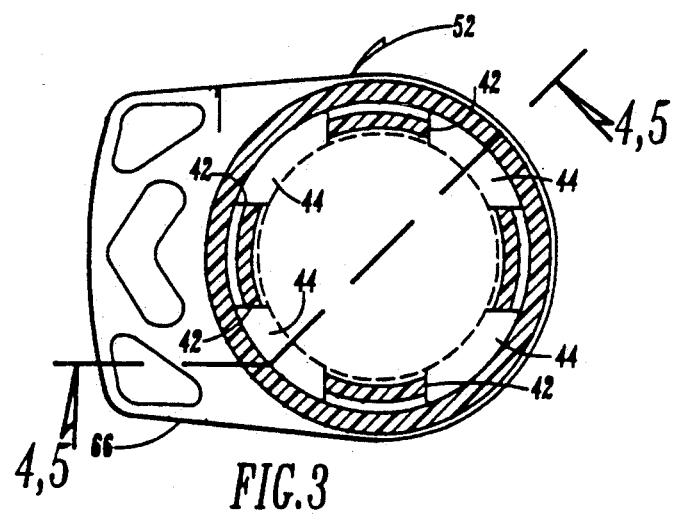
FIG. 3 is a sectional view taken along line 3—3 of FIG. 2.

A bleed valve 96 is provided in coupler body 18 for relieving any trapped pressurized water within the hose 12, the supply bore 38, or the supply flow passageway 36. It is desirable to relieve this pressure prior to removal of the coupler 16 from the faucet spout 118 after the dishwashing process is complete. As shown in FIG. 2, bleed valve 96 includes a tube 98 which is integrally formed in the coupler body 18. Threaded within tube 98 is a threaded valve seat 100 having a counter bore 102 therein. A valve bore 108 extends through valve seat 100 and includes a valve stem 104 slidably mounted therein. The inner end of valve stem 104 has a tapered bell shaped end 106 which seats on the inner end of valve bore 108 as shown in FIG. 2. At its longitudinal center, valve stem 104 has a diameter which is less than the diameter of valve bore 108. Extending from valve bore 108 is a bleed aperture 110 which leads to a bleed passageway 114. Spring 112 yieldably urges the valve stem 104 to the right as viewed in FIG. 2 so that the bell shaped end 106 of valve stem 104 is seated within the valve bore 108. However, the manual depression of a button 120 against the bias of spring 112 causes the bell shaped end 106 of valve stem 104 to move to the left as shown in dashed lines in FIG. 2. This permits any pressurized water to pass from passageway 36 into the valve bore 108 and downwardly through bleed aperture 110 and bleed passageway 114 into first discharge opening 24. Such drainage relieves the pressure within passageway 36, bore 38, and inlet 20 so that the coupler 16 can be removed from the faucet spout 118 without splashing.

The use of bearing ribs 70-72 maintains proper alignment of the retainer formed by the sleeve or collar 52 during its sliding movement and prevents binding of the sleeve or collar 52 during its downward sliding movement. When the sleeve or collar 52 moves upwardly to its hold position, the cam shoulder 54 of sleeve or collar 52 engages the outer cam shoulder 46 of locking lugs 44 so as to urge them radially inwardly into their locked position retentively engaging the faucet spout 118. This cam shoulder 46 ensures smooth movement of the sleeve or collar 52 to its hold position, and prevents binding of the sleeve or collar 52 against the locking lugs 44 as the sleeve or collar 52 moves to its upper most hold position.

The preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

We claim:

1. A coupler assembly for connecting an appliance inlet hose to a faucet spout comprising:

a coupler body having an outer cylindrical surface, an inlet opening sized and shaped to telescopically fit over said faucet spout, a conduit adapted to be connected to said inlet hose, and a passageway leading from said inlet opening to said conduit;

lock means movable mounted to said coupler body and being movable from a locked position for retentively engaging said faucet spout when said inlet opening of said coupler body is telescopically fitted over said faucet spout to an unlocked position permitting removal of said inlet opening from said faucet spout;

collar means slidably fitted over said coupler body for axial sliding movement on said coupler body from a hold position engaging said lock means and holding said lock means in said locked position to a release position permitting said lock means to move to said unlocked position, said collar means having a thumb tab protruding radially outwardly therefrom;

said collar means having a radially inwardly facing interior cylindrical surface spaced radially outwardly from said outer cylindrical surface of said coupler body, said collar means having a first axial end adjacent said inlet opening and a second axial end positioned further away from said inlet opening than said first axial end, at least one bearing means protruding radially outwardly from said outer cylindrical surface of said coupler body, said bearing means having an axially extending bearing surface which has an axial length positioned so as to cause it to slidably engage said collar means adjacent said second axial end thereof throughout movement of said collar means from said hold position to said release position, whereby said bearing means will maintain said collar means in substantial axial alignment with said coupler body so as to minimize frictional binding therebetween during movement of said collar means from said hold position to said release position;

spring means yieldably urging said collar means to said hold position.

2. A coupler assembly according to claim 1 wherein said bearing means comprises a plurality of elongated axially extending body ribs protruding radially outwardly from said outer cylindrical surface of said coupler body.

3. A coupler assembly according to claim 2 wherein said collar means includes at least an elongated axially extending first collar rib protruding radially inwardly from said interior cylindrical surface of said collar means and slidably bearing against at least one of said body ribs so as to keep said interior cylindrical surface of said collar means spaced radially outwardly from said body ribs.

4. A coupler assembly according to claim 2 wherein an elongated axially extending pair of collar ribs protrude radially inwardly from said interior cylindrical surface of said collar means, said pair of collar ribs being parallel and spaced apart to form an elongated axially extending slot therebetween, at least one of said body ribs protruding within said slot to prevent rotation of said collar means with respect to said coupler body.

5. A coupler assembly according to claim 1 and further comprising guide means associated with said coupler body and said collar means for preventing rotational movement of said collar means relative to said coupler body.

6. An improvement in a coupler assembly for connecting an appliance to a faucet, said improvement comprising:

a coupler body having an inlet end provided with an inlet opening sized and shaped to telescopically fit over said faucet:

means for connecting said inlet end of said coupler body to said faucet including retaining collar means surrounding said inlet end and manually movable from a faucet holding position to a faucet releasing position;

tab means integral with and extending radially outward from said retaining collar means, said tab means being manually engageable by an appliance operator for effecting axial movement of said retaining collar means relative to said coupler body in one-handed connection and disconnection of said coupler assembly;

guide means on said coupler body and said retaining collar means for permitting axial sliding movement of said retaining collar means relative to said coupler body and for preventing rotational movement of said retaining collar means relative to said coupler body.

7. An improvement in a coupler assembly for connecting an appliance to a faucet, said improvement comprising:

a coupler body having an inlet end provided with an inlet opening sized and shaped to telescopically fit over said faucet:

means for connecting said inlet end of said coupler body to said faucet including retaining collar means surrounding said inlet end and manually movable from a faucet holding position to a faucet releasing position;

tab means integral with and extending radially outward from said retaining collar means, said tab means being manually engageable by an appliance operator for effecting axial movement of said retaining collar means relative to said coupler body in one-handed connection and disconnection of said coupler assembly;

a body guide means on said coupler body and a collar guide means on said retaining collar means, said body guide means and said collar guide means cooperating to provide nonbinding axial movement of said retaining collar means with respect to said coupler body from said faucet holding position to said faucet releasing position while at the same time preventing rotational movement of said retaining collar means with respect to said coupler body.

8. A coupler assembly according to claim 7 wherein said body guide means comprises at least first and second elongated axially extending body ribs protruding outwardly from said coupler body and slidably engaging said retaining collar means.

9. A coupler assembly according to claim 8 wherein said body guide means further comprises at least a third axially extending body rib on said coupler body, said collar guide means including an elongated slot formed in said collar means, said third body rib fitting within said slot to prevent rotational movement of said retaining collar means with respect to said coupler body.

10. A coupler assembly for connecting an appliance inlet hose to a faucet spout comprising:

a coupler body having an outer cylindrical surface, an inlet opening sized and shaped to telescopically fit over said faucet spout, a conduit shaped to be connected to said inlet hose, and a passageway leading from said inlet opening to said conduit;

lock means movable mounted to said coupler body and being movable from a locked position for retentively engaging said faucet spout when said inlet opening of said coupler body is telescopically fitted over said faucet spout to an unlocked position permitting removal of said inlet opening from said faucet spout;

collar means slidably fitted over said coupler body for axial sliding movement on said coupler body from a hold position engaging said lock means and holding said lock means in said locked position to a release position permitting said lock means to move to said unlocked position;

a thumb tab protruding radially outwardly from said collar means;

a plurality of elongated axially extending body ribs protruding radially outwardly from said outer cylindrical surface of said coupler body, said body ribs slidably engaging said collar means to provide bearing surfaces for said collar means during movement between said hold and release positions;

said collar means including a radially inwardly facing interior cylindrical surface spaced radially outwardly from said outer cylindrical surface of said coupler body, an elongated axially extending first collar rib protruding radially inwardly from said interior cylindrical surface of said collar means and slidably bearing against at least one of said body ribs so as to keep said interior cylindrical surface of said collar means spaced radially outwardly from said body ribs.

* * * * *